United States Patent
Hendriks

(10) Patent No.: US 6,278,560 B1
(45) Date of Patent: Aug. 21, 2001

(54) OPTICAL SCANNING DEVICE

(75) Inventor: Bernardus H. W. Hendriks, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/459,624

(22) Filed: Dec. 13, 1999

(30) Foreign Application Priority Data

Dec. 21, 1998 (EP) ................................................ 98204351

(51) Int. Cl.[7] ................. G02B 9/00; G02B 9/08; G11B 7/00
(52) U.S. Cl. ................. 359/738; 369/112.24; 369/118
(58) Field of Search ................. 359/721, 738–740; 369/94, 118, 112.22, 112.24

(56) References Cited

U.S. PATENT DOCUMENTS 5,790,506 * 8/1998 Morita et al. .................. 369/118
5,920,532 * 7/1999 Yagi et al. .................. 369/53.22

FOREIGN PATENT DOCUMENTS

0762398A1  12/1997 (EP) .................. G11B/7/125

* cited by examiner

Primary Examiner—Jordan M. Schwartz

(57) ABSTRACT

An optical scanning device can scan two different types of optical record carrier (1; 25), requiring a scanning beam (15) having different numerical apertures. The device has two stops (33; 32) at different positions along the optical axis of the path followed by the radiation beam for both types of discs. The first stop (33) limits the numerical aperture of the radiation beam when scanning the first type of record carrier (1). The second stop (32) limits the numerical aperture when scanning the second type of record carrier (25).

4 Claims, 3 Drawing Sheets

OPTICAL SCANNING DEVICE

FIELD OF THE INVENTION

The invention relates to an optical device for scanning optical record carriers of a first type with a radiation beam having a first numerical aperture and record carriers of a second, different type with a radiation beam having a second numerical aperture, comprising a radiation source for providing a radiation beam having one optical axis, an optical system for converging the radiation beam to a focused beam so as to form a spot on the record carrier which is being scanned.

BACKGROUND OF THE INVENTION

The amount of information that can be stored on an optical record carrier depends, inter alia, on the size of the spot formed by the scanning device on the information layer of the record carrier. The information density and, hence, the amount of stored information can be increased by decreasing the size of the spot. The spot size can be reduced by increasing the numerical aperture of the radiation beam forming the spot.

An optical device of the above type is known from European patent application No. 0762398. An objective lens in the optical head of the device focuses a radiation beam from a radiation source to a spot on the record carrier. An adjustable diaphragm positioned between the radiation source and the objective lens adapts the numerical aperture of the radiation beam to the type of record carrier which is being scanned. The diaphragm is in the form of an electrically operated liquid crystal shutter. The shutter transmits only the central part of the incident radiation beam when scanning a first type of record carrier and transmits the entire radiation beam when scanning a second type of record carrier, thereby changing the numerical aperture of the beam incident on the record carrier. A disadvantage of the shutter is that it affects the wavefront quality of the transmitted radiation beam because of the different optical properties of the shutter in the central part and in the annular part around it. Another disadvantage is that the shutter constitutes an optical element which adds to the manufacturing cost of the scanning device.

SUMMARY OF THE INVENTION

It is an object of the invention to provide a scanning device that does not have the above disadvantages.

In accordance with the invention, this object is achieved by a scanning device as described in the opening paragraph, which is characterized in that the optical system comprises a first fixed stop and, at a different position on the optical axis, a second fixed stop, the first and the second stop determining the first and the second numerical aperture, respectively. The fixed stops do not affect the quality of the wavefront transmitted by the stops and can easily be integrated with other elements in the optical path, e.g. in the form of a non-transparent coating with a central aperture applied to a surface of a lens. When changing between different types of record carrier, the optical properties or position of one or more elements in the optical head will be changed to obtain a proper spot on the record carrier. The changes may include a change in the axial position of the objective lens to allow for a change in the axial position of the spot, a change in the mutual distance of elements in the optical head or a change in wavelength. Such changes vary the shape of the radiation beam through the optical elements between a first and a second shape. If the first and the second stop are arranged at appropriate positions in the optical path, the first stop will limit the diameter of the radiation beam when it has the first shape, whereas the second stop will limit the diameter of the radiation beam when it has the second shape. If the optical head is provided with two or more radiation sources and a beam-combining element so as to bring the radiation beams of the radiation sources on a common optical path, the first and the second stop are located on the common path.

In a preferred embodiment of the scanning device, the second stop is arranged in the path of the focused beam and the second numerical aperture is smaller than the first numerical aperture. Counter-intuitively, the second stop determines the smaller numerical aperture and does not affect the larger numerical aperture.

In a special embodiment, the optical system comprises an objective system having a first and a second optical element, the first element being further remote from the radiation source than the second element. The objective system is suitable for focusing a high numerical aperture beam. The second stop is preferably a diaphragm arranged on the first optical element.

BRIEF DESCRIPTION OF THE DRAWINGS

The objects, advantages and features of the invention will be apparent from the following, more detailed description of the invention, as illustrated in the accompanying drawings, in which.

DETAILED DESCRIPTION OF PREFERRED EMBODIMENTS

Figure 1:
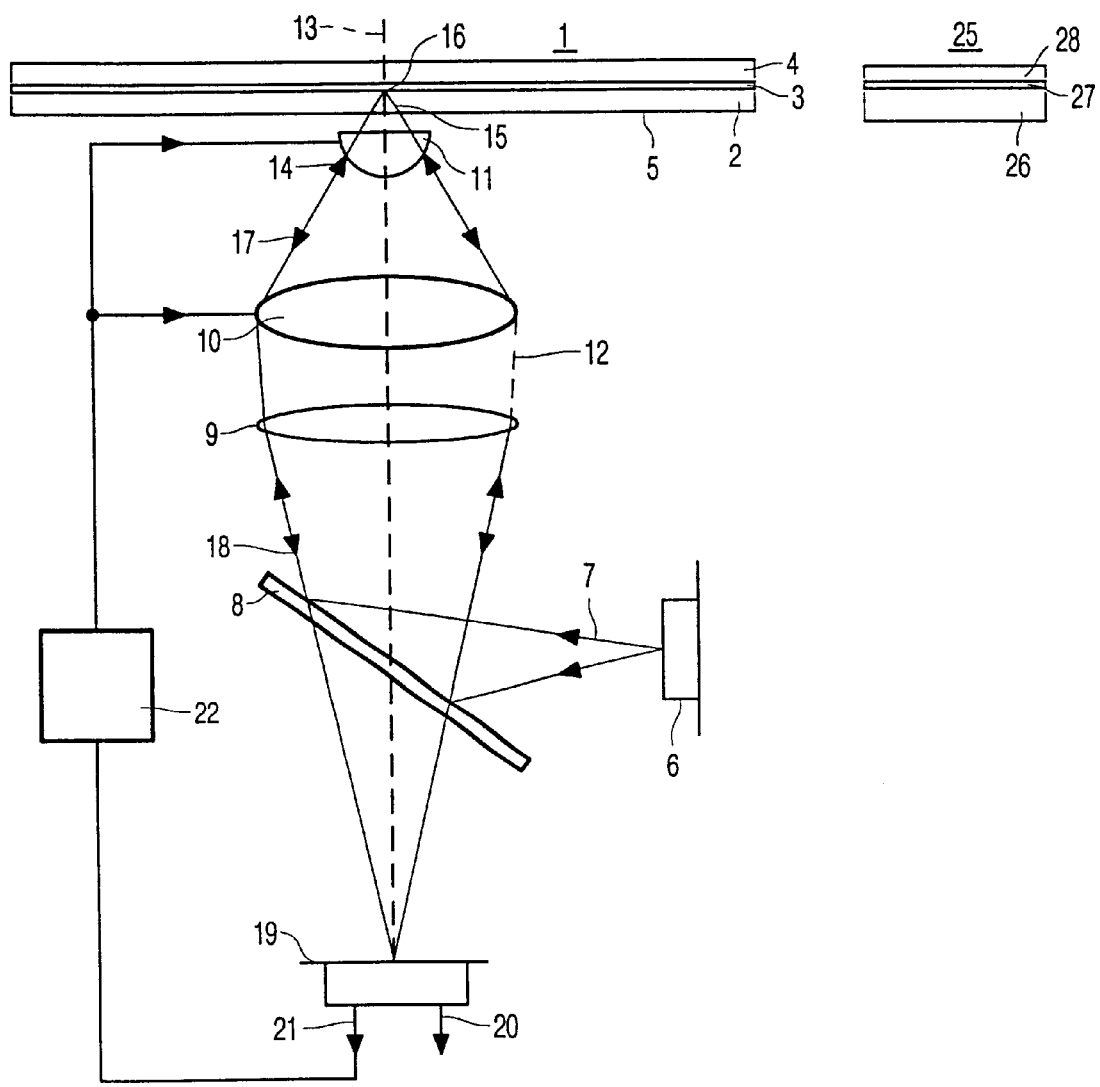
FIG. 1 shows a scanning device according to the invention.

FIG. 1 shows a device for scanning at least two different types of optical record carriers. The Figure shows an optical record carrier 1 of the first type. The record carrier comprises a transparent layer 2, one side of which is provided with an information layer 3. The side of the information layer facing away from the transparent layer is protected from ambient influences by a protection layer 4. The side of the transparent layer facing the device is referred to as the entrance face 5. The transparent layer 2 may act as a substrate for the record carrier by providing mechanical support for the information layer. Alternatively, the transparent layer may have the sole function of protecting the information layer, while the mechanical support is provided by a layer on the other side of the information layer, for instance, by the protection layer 4 or by a further information layer and a transparent layer connected to the information layer 3. Information may be stored in the information layer 3 of the record carrier in the form of optically detectable marks arranged in substantially parallel, concentric or spiral tracks, not indicated in the Figure. The marks may have any optically readable form, e.g. the form of pits, or areas with a reflection coefficient or a direction of magnetization different from their surroundings, or a combination of these forms.

The scanning device comprises a radiation source 6, for example, a semi-conductor laser, emitting a diverging radiation beam 7. A beam splitter 8, for example, a semi-transparent plate, reflects the radiation towards a lens system. The lens system comprises a collimator lens 9, an objective lens 10 and a plano-convex lens 11. The collimator lens 9 changes the diverging radiation beam 7 to a collimated beam 12. The objective lens 10, having an optical axis 13, transforms the collimated radiation beam 12 into a converging beam 14 incident on the lens 11. The collimator lens 9 and the objective lens 10 may be combined to a single lens. The plano-convex lens 11 changes the incident beam 14 into a converging beam 15, which focuses to a spot 16 on the information layer 3. The plano-convex lens 11 has a convex surface and a flat surface. The flat surface faces the transparent layer 2 and forms a gap between the lens and the layer. The flat surface may be slightly convex, hardly affecting the optical behavior but providing a better aerodynamic behavior of the optical head when the lenses 10 and/or 11 are embedded in a slider suspended on an air bearing above the entrance face 5. Although the objective lens 10 is indicated in the Figure as a single lens element, it may comprise more elements, and may also comprise a hologram operating in transmission or reflection, or a grating for coupling radiation out of a waveguide carrying the radiation beam. Radiation of the converging beam 15 reflected by the information layer 3 forms a reflected beam 17, which returns on the optical path of the forward converging beam 14. The objective lens 10 and the collimator lens 9 transform the reflected beam 17 to a converging reflected beam 18, and the beam splitter 8 separates the forward and reflected beams by transmitting at least part of the reflected beam 18 towards a detection system 19. The detection system captures the radiation and converts it into one or more electric signals. One of these signals is an information signal 20, the value of which represents the information read from the information layer 3. Another signal is a focus error signal 21, the value of which represents the axial difference in height between the spot 16 and the information layer 3. The focus error signal is used as input for a focus servocontroller 22, which controls the axial position of the objective lens 10 and/or the plano-convex lens 11, thereby controlling the axial position of the spot 16 in such a way that it coincides substantially with the plane of the information layer 3. The part of the detection system, including one or more radiation-sensitive detection elements and an electronic circuit processing the output signal of the detection elements, used for generating the focus error is referred to as the focus error detection system. The focus servosystem for positioning the lens system comprises the focus error detection system, the focus servocontroller and an actuator for moving the lens system.

The gap, i.e. the distance between the planar surface of lens 11 and the entrance surface 5 of the record carrier 1, may be maintained substantially at a nominal value. This can be attained by using a passive air bearing construction carrying lens 11 and designed to maintain the gap at its nominal value. It is also possible to use an optically derived error signal which represents the deviation of size of the actual gap from its nominal value; a special actuator then keeps the plano-convex lens at its prescribed distance from the transparent layer by using the error signal as an input signal for the actuator servoloop. The actuator of the lens 10 is controlled by the focus error signal 21 so as to keep the spot 16 on the information layer 3.

In another embodiment, suitable for record carriers having a transparent layer with a thickness that is relatively constant over the record carrier, the distance between the lenses 10 and 11 is fixed, and the axial position of the combination of the two lenses is controlled by the focus error signal.

In an alternative embodiment, the axial position of both lenses 10 and 11 is controlled by the focus error signal and a signal representing the spherical aberration present in the beam coming from the record carrier. The spherical aberration due to passage through a transparent layer such as layer 2 having a nominal thickness is preferably compensated in the objective lens 10 and/or plano-convex lens 11 by an appropriate design. The spherical aberration caused by a deviation of the thickness from its nominal value is preferably compensated by a corresponding change in the distance between the lenses 10 and 11. The distance may be controlled by a signal representing the spherical aberration and determined by a detector arranged in the radiation beam coming from the record carrier.

FIG. 1 also shows a record carrier 25 of a second type. The record carrier comprises a transparent layer 26 having a larger thickness than the transparent layer 2 of the record carrier 1 of the first type. An information layer 27 of the record carrier 25 may have a lower information density than the information layer 3 of the record carrier of the first type. The side of the information layer facing away from the transparent layer is protected from ambient influences by a protective layer 28. When the scanning is changed from the information layer 3 to the information layer 27, the position of the objective lens 10 is adapted to be closer to the information layer so as to position the spot 16 on the information layer 27. The different thickness of the transparent layer 26 introduces spherical aberration in the radiation beam. When the distance between the objective lens 10 and the plano-convex lens 11 is changed from a design distance, the plano-convex lens introduces, an amount of spherical aberration in the radiation beam, which is due to the changing magnification. An appropriate reduction of the distance compensates the spherical aberration due to the different thickness of the transparent layer 27.

The spherical aberration introduced by small changes in the thickness of the transparent layer 27 may also be compensated by changing the distance between the objective lens 10 and the plano-convex lens 11. A measurement of the spherical aberration by the detection system 19 may provide an electric signal representing the spherical aberration in the radiation beam coming from the record carrier. The signal may be used as input for a servosystem controlling the distance between the two lenses. During the focusing action of the objective lens, the gap should be maintained substantially at its nominal value in the above-mentioned way. It should be noted that the control of the spherical aberration in dependence on the thickness of the transparent layer may be used in any scanning device for optical record carriers, independent of the method of changing the numerical aperture between different types of record carriers.

Figure 2:
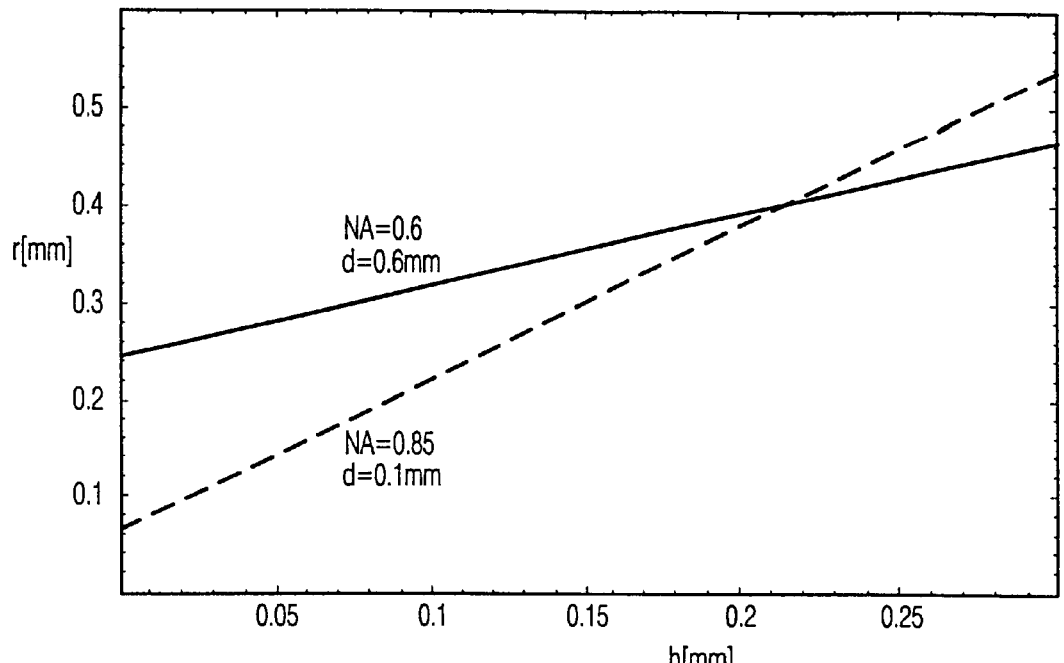
FIG. 2 shows the radius r of the radiation beam at the lens surface closest to the record carrier as a function of the height h of the surface above the record carrier for two cases having different values for the numerical aperture NA and the thickness d of the transparent layer of the record carrier.

FIG. 2 shows the radius of the radiation beam at the lens surface of the plano-convex lens 11 facing the record carrier for two types of record carrier as a function of the height h of the flat surface of the plano-convex lens 11 above the entrance face of the record carrier. The broken line is shown for a first type of record carrier having a transparent layer thickness d of 0.1 mm and scanned by a beam having a numerical aperture NA of 0.85. The solid line is shown for a second type of record carrier having a transparent layer thickness d of 0.6 mm and scanned by a beam having a numerical aperture NA of 0.60. For a particular embodiment of the scanning device, the height is 0.1 mm above a transparent layer of 0.1 mm thickness, while in the case of a transparent layer having a 0.6 mm thickness, the height is 0.051 mm. It can be deduced from FIG. 2 that the radius of the radiation beam at the planar surface is equal to 0.22 mm for a numerical aperture of 0.85, while it is equal to 0.29 mm for a numerical aperture of 0.85. Hence, the beam diameter at the planar surface is smaller for NA=0.85 than for NA=0.60.

Figure 3A:
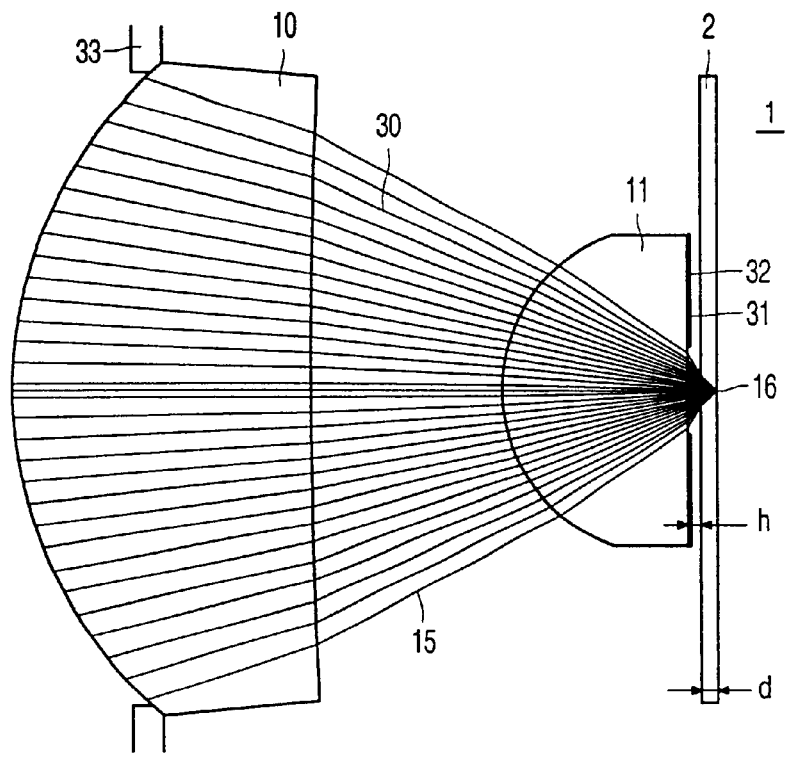
FIGS. 3A and 3B show rays of the radiation beam when scanning a first and a second type of record carrier.

FIG. 3A shows rays 30 of the radiation beam 15 traversing the objective lens 10 and the plano-convex lens 11 in the case of the first type of record carrier corresponding to the broken line in FIG. 2. In this NA=0.85 case, the numerical aperture is limited by the stop 33 on or near the objective lens 10. The stop may be defined by an opaque ring 33, which may form part of a holder for the objective lens 10. Alternatively, the stop may be limited by an opaque coating having a transparent opening applied to one of the two surfaces of the objective lens 10.

Figure 3B:
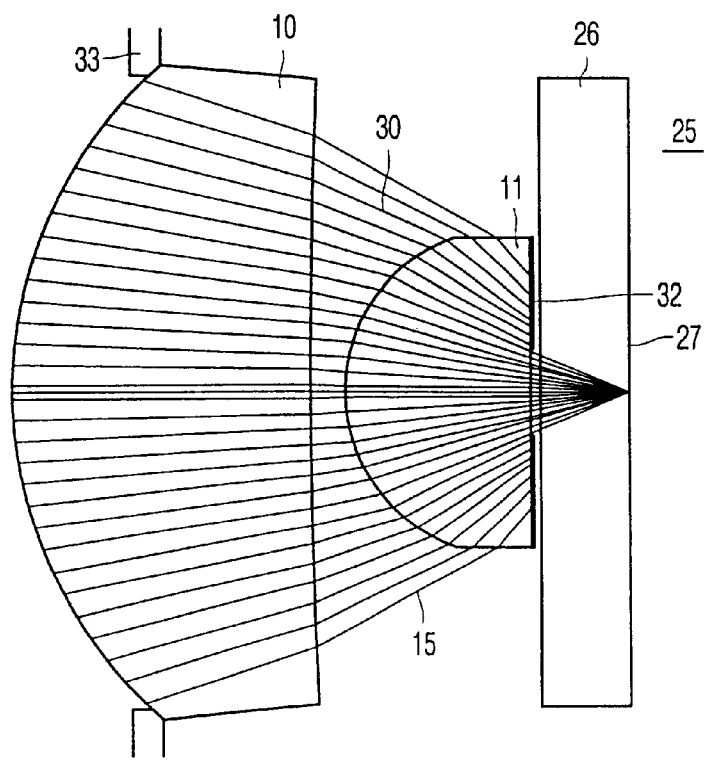

FIG. 3B shows the rays of the radiation beam 15 in the case of the second type of record carrier 25, corresponding to the solid line in FIG. 2. A stop on or near the planar surface 31 with a diameter equal to that of the beam diameter in the plane of the stop for the NA=0.85 case will limit the numerical aperture of the radiation beam. The stop is indicated by a bold line 32 in the Figure. In comparison with the situation in FIG. 3A, the position of both lenses 10 and 11 has been adjusted in order to obtain a spot on the information layer 27 which is corrected for the change in spherical aberration caused by the larger thickness of the transparent layer 26.

FIGS. 3A and 3B demonstrate the change in diameter of the radiation beam at the planar surface 31 when the thickness of the transparent layer is changed. The stop 32 will not affect the numerical aperture of the NA=0.85 radiation beam, because the diameter of the NA=0.85 beam at the planar surface is smaller than the diameter of the NA=0.60 beam. FIGS. 3A and 3B show that the numerical aperture of the radiation beam 15 is limited by a first stop 33 when scanning a record carrier 1 of the first type, while the numerical aperture of the radiation beam 15 is limited by a second stop 32 when scanning a record carrier 25 of the second type.

Figure 4A:
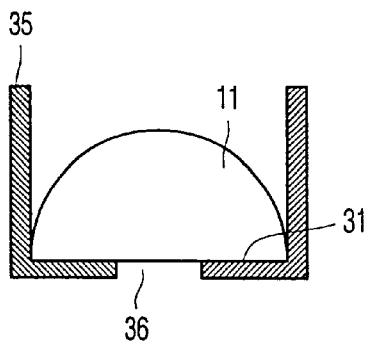
FIGS. 4A and 4B show two embodiments of a stop on a plano-convex lens.
Figure 4B:
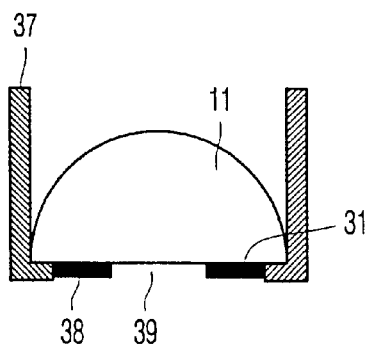

FIG. 4 shows two embodiments of the plano-convex lens 11. In FIG. 4A, the lens is fixed in a lens holder 35 having a circular aperture 36 which is effective as a stop near the planar surface 31. The lens in FIG. 4B is fixed in a lens holder 37 having a relatively large aperture near the planar surface 31. An opaque coating 38 on the planar surface 31 having a transparent opening 39 acts as a stop. The openings 36 and 39 may be circular or may have any other shape, such as an elliptic shape so as to obtain a non-circularly symmetric spot 16.

It will be clear that the correct position of the two stops for a particular optical head can be found from graphs of the beam radius as a function of the position of an optical element that is adjusted in dependence on the type of record carrier which is being scanned, like the graph shown in FIG. 2. The graphs should be made for a series of positions along the optical axis so as to find the position where the beam radius for the first type of record carrier is larger than that for the second type of record carrier and the position where the beam radius for the second type of record carrier is larger than that for the first type of record carrier.

What is claimed is:

1. An optical device for scanning optical record carriers of a first type with a radiation beam having a first numerical aperture and record carriers of a second, different type with a radiation beam having a second numerical aperture, comprising a radiation source for providing a radiation beam having one optical axis, an optical system for converging the radiation beam to a focused beam so as to form a spot on the record carrier which is being scanned, characterized in that the optical system comprises a first fixed stop having a non-variable aperture diameter and fixed in a direction lateral to the optical axis and, at a different position on the optical axis, a second fixed stop having a non-variable aperture diameter and fixed in a direction lateral to the optical axis, the first and the second stop determining the first and the second numerical aperture, respectively.

2. An optical scanning device as claimed in claim 1, wherein the second stop is arranged in the path of the focused beam and the second numerical aperture is smaller than the first numerical aperture.

3. An optical scanning device as claimed in claim 1, wherein the optical system comprises an objective system having a first and a second optical element, the first element being further remote from the radiation source than the second element.

4. An optical scanning device as claimed in claim 3, wherein the second stop is a diaphragm arranged on the first optical element.

* * * * *